United States Patent
Gerlach et al.

(10) Patent No.: US 9,781,157 B1
(45) Date of Patent: *Oct. 3, 2017

(54) MITIGATING DENIAL OF SERVICE ATTACKS

(71) Applicant: Go Daddy Operating Company, LLC, Scottsdale, AZ (US)

(72) Inventors: Scott Gerlach, Phoenix, AZ (US); Don LeBert, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,936

(22) Filed: Sep. 29, 2016

Related U.S. Application Data

(63) Continuation of application No. 14/825,133, filed on Aug. 12, 2015, now Pat. No. 9,479,532, which is a continuation of application No. 13/943,429, filed on Jul. 16, 2013, now Pat. No. 9,141,789.

(51) Int. Cl.
*H04L 29/06* (2006.01)

(52) U.S. Cl.
CPC ...... *H04L 63/1458* (2013.01); *H04L 63/0254* (2013.01); *H04L 63/1416* (2013.01); *H04L 63/1425* (2013.01); *H04L 2463/142* (2013.01)

(58) Field of Classification Search
CPC ............. H04L 63/1458; H04L 63/1416; H04L 63/0254; H04L 63/1425; H04L 2463/142; G06F 21/55
USPC ........................................................ 726/23
See application file for complete search history.

(56) References Cited

U.S. PATENT DOCUMENTS

| | | | |
|---|---|---|---|
| 2010/0131638 A1* | 5/2010 | Kondamuru | G06F 9/5083 709/224 |
| 2014/0157405 A1* | 6/2014 | Joll | H04L 63/1425 726/22 |
| 2014/0181966 A1* | 6/2014 | Carney | H04L 63/1458 726/22 |

* cited by examiner

*Primary Examiner* — Kambiz Zand
*Assistant Examiner* — Benjamin Kaplan
(74) *Attorney, Agent, or Firm* — Quarles & Brady LLP

(57) ABSTRACT

Several methods are disclosed for detecting and mitigating Distributed Denial-of-Service (DDoS) attacks that are intended to exhaust network resources. The methods use DDoS mitigation devices to detect DDoS attacks using operationally based thresholds. The methods also keep track of ongoing attacks, have an understanding of "protected IP space," and activate appropriate mitigation tactics based on the severity of the attack and the capabilities of the DDoS mitigation devices.

16 Claims, 3 Drawing Sheets

US 9,781,157 B1

MITIGATING DENIAL OF SERVICE ATTACKS

CROSS REFERENCE TO RELATED PATENT APPLICATIONS

This application is a continuation of U.S. patent application Ser. No. 14/825,133, filed Aug. 12, 2015, and titled "Mitigating Denial of Service Attacks," which is a continuation of U.S. patent application Ser. No. 13/943,429 (now U.S. Pat. No. 9,141,789), filed Jul. 16, 2013 and titled "Mitigating Denial of Service Attacks."

FIELD OF THE INVENTION

The present invention generally relates to network security and, more particularly, methods for mitigating Distributed Denial-of-Service (DDoS) attacks on a network.

SUMMARY OF THE INVENTION

In one embodiment of the present invention, a method for mitigating a DDoS attack is disclosed. In this embodiment, a first plurality of DDoS Devices receive network traffic from a network. A traffic rate may be periodically polled for each of the DDoS Devices.

A throughput capability for each of the DDoS Devices may also be determined. The throughput capability may generally be found from the specification created by the manufacturer for each DDoS Device.

The polled traffic rate may be compared with the throughput capability for each DDoS Device to determine if each DDoS Device can handle its polled traffic rate without intervention. Past DDoS mitigations may be removed from each DDoS Device that has a greater throughput capability than its current polled traffic rate.

A malicious traffic rate may be determined for each of the DDoS Devices by polling each device.

An operational limit capability for each DDoS Devices may be determined. The operational limit capabilities may be determined, for example, by pulling individual device limits from a DDoS Mitigation Traffic Limits database.

A notification may be sent to a monitor web page for each DDoS Device in the first plurality of DDoS Devices that has its malicious traffic rate approach its operational limit capability within a predetermined amount.

For each DDoS Device in the first plurality of DDoS Devices that has its malicious traffic rate greater than its operational limit capability, a notification may be sent to the monitor web page and traffic from the DDoS Device may be routed to a second DDoS Device that has an operational limit capability greater than the malicious traffic rate.

As an enhancement, a malicious traffic rate and an operational limit capability may be determined for the first plurality of DDoS Devices. If the malicious traffic rate for the first plurality of DDoS Devices approaches the operational limit capability for the first plurality of DDoS Devices within a predetermined amount, a notification may be sent to the monitor web page.

If the malicious traffic rate for the first plurality of DDoS Devices is greater than the operational limit capability for the first plurality of DDoS Devices, a notification may be sent to the monitor web page and the network traffic may be swung from the first plurality of DDoS Devices to a second plurality of DDoS Devices.

In another embodiment, DDoS traffic may be identified based upon traffic flow and individual packet payloads utilizing an intrusion detection and prevention engine. A validity of a combination of flag values in a Transmission Control Protocol (TCP) header may be determined. A TCP header is contained within a TCP packet and defines control data and metadata about the data section that follows the header. The TCP header uses flags as control bits that indicate how the packet is to be utilized. The flags are mutually exclusive as defined by the Internet Engineering Task Force and the Internet Society standards body. If the combination of flag values in the TCP header are not valid, a first Distributed Denial of Service (DDoS) mitigation may be activated. A number of TCP flags received over a first period of time may be determined. If the number of TCP flags received over the first period of time exceeds a first predetermined threshold, a second DDoS mitigation may be activated. A number of packets received over a second period of time may be determined. If the number of packets received over the second period of time exceeds a second predetermined threshold, a third DDoS mitigation may be activated. A number of HTTP or DNS activities over a third period of time may be determined. A HTTP or DNS activity may be defined as the process of using HTTP verbs, DNS queries, or connections to services. If the number of HTTP or DNS activities over the third period of time exceeds a third predetermined threshold, a fourth DDoS mitigation may be activated.

In another embodiment, a plurality of Intrusion Detection Systems (IDS) may be used to capture a plurality of packet data from network traffic on a network. The plurality of IDS may process the plurality of packet data. A first one or more statistics may be calculated from the plurality of packet data. A second one or more statistics may be read from a traffic stats database. The first one or more statistics may be stored in the traffic stats database. A change in the network traffic may be determined by comparing the first one or more statistics with the second one or more statistics. DDoS mitigation may be activated or modified based on changes in the network traffic.

Further, a high delta based on the first one or more statistics and the second one or more statistics may be determined. Processing the plurality of packet data is preferably done in real time. The first one or more statistics may be calculated by one or more of the IDS, by a server or by a combination of IDSs and servers. The change in traffic may use statistics gathered over a period and preferably a period longer than 7 days.

Calculating the first one or more statistics from the plurality of packet data may use Open Systems Interconnection (OSI) Model layer 3, OSI Model layer 4, or OSI Model layer 7.

In another embodiment, a plurality of Intrusion Detection Systems (IDS) may be used to capture and process data from network traffic on a network. An application (piece of software sending the network traffic) and an application rate (the rate at which the application communicates over the network) corresponding to the data may be determined. A filter may be generated that is specific to the application. A filter that is specific for an application may create a pattern that enforces correct application behavior and/or communication rate based upon standards and known normal traffic rates. The filter may consist of, but is not limited to, patterns to match content within the received packet that may be legitimate or illegitimate traffic, valid application traversal paths, or other identified anomalies within the transmitted traffic. A DDoS mitigation may then be activated or modified using the generated filter.

In addition, a first one or more statistics may be calculated from the data. A second one or more statistics may be read from a traffic stats database. The first one or more statistics may be stored in the traffic stats database for later use. In preferred embodiments, a plurality of long term statistics may be calculated using at least the second one or more statistics and a plurality of high application rates with low variation based on the plurality of long term statistics may be determined. The data from the network traffic is preferably taken from an Open Systems Interconnection (OSI) Model layer 3, OSI Model layer 4, and/or OSI Model layer 7.

The above features and advantages of the present inventions will be better understood from the following detailed description taken in conjunction with the accompanying drawings.

DETAILED DESCRIPTION

Figure 1:
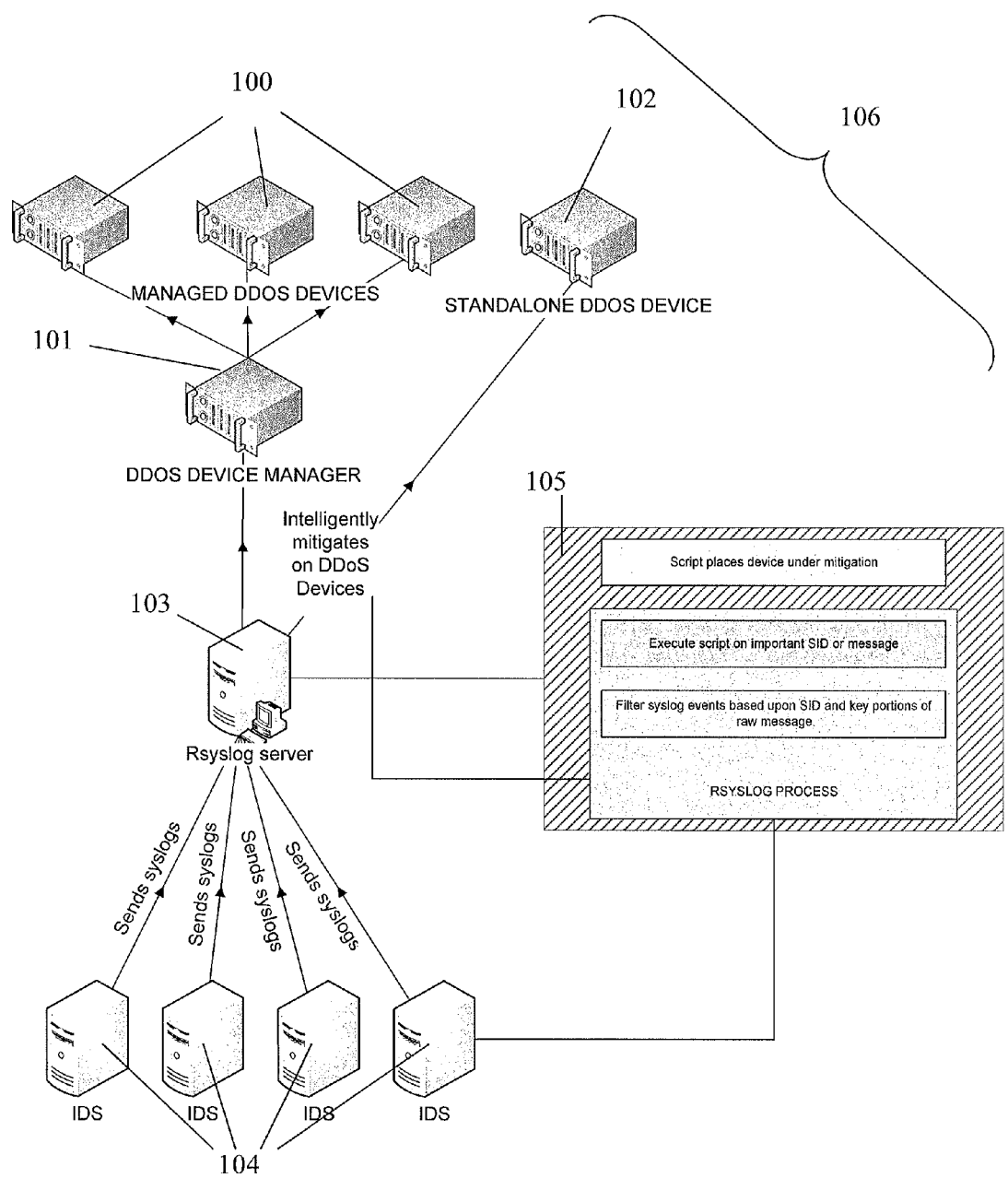
FIG. 1 illustrates a possible embodiment of a system for the rapid detection and mitigation of threats to a network.

The present inventions will now be discussed in detail with regard to the attached drawing figures, which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

The invention will now be described with reference to FIG. 1. A network 106 is a collection of links and nodes (e.g., multiple computers and/or other devices connected together) arranged so that information may be passed from one part of the network 106 to another over multiple links and through various nodes. Examples of networks include the Internet, the public switched telephone network, the global Telex network, computer networks (e.g., an intranet, an extranet, a local-area network, or a wide-area network), wired networks, wireless networks, and hybrid networks. While a network 106 may be owned and operated by a plurality of companies, partnerships, individuals, etc., the network 106 in the present invention is preferably owned and operated by a single entity, such as a company, partnership or individual that is trying to increase the security of its network 106.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., web site owners or operators) place multimedia information (e.g., text, graphics, audio, video, animation, and other forms of data) at specific locations on the Internet referred to as webpages. Websites comprise a collection of connected or otherwise related webpages. The combination of all the websites and their corresponding webpages on the Internet is generally known as the World Wide Web (WWW) or simply the Web. Network servers may support websites that reside on the Web.

When an external user accesses the network 106 via the Internet, the external user will have an associated IP address and possibly a username that the network 106 uses to identify the user. The IP address of the external user is needed so the network 106 can send information to the external user. The external user may be a legitimate customer/user of the network 106, a hacker or malicious attacker of the network 106 or may be a legitimate customer's computer that has been taken over by a hacker or malicious attacker of the network 106. If the external user is a threat to the network 106, the invention takes action to mitigate the threat. The external user may only access the network 106 through the one or more security devices.

The network 106 may also include one or more internal users of the network 106 who may also be identified with an IP address or a username. Internal users may also be monitored with the present invention. All traffic from internal users is preferably directed through the one or more security devices. While internal users are generally less likely to be a hacker or malicious user, the traffic from internal users may also be screened by the one or more security devices.

A network 106 may include one or more security devices. Preferably, all traffic entering the network 106, enters the network 106 through a security device. Traffic may be broken down into packets with each packet containing control and user data.

As non-limiting examples, the one or more security devices may include a Managed DDoS Mitigation Device 100, DDoS Management Device 101, Unmanaged DDoS Mitigation Device (also known as a Standalone DDoS Device) 102, Intrusion Protection System (IPS), Intrusion Detection System (IDS) 104, network device or some combination thereof. The network device may be, as non-limiting examples, a router, switch, firewall, or load balancer. The IDS 104 may be a device or software application running on a server that monitors network or system activities for malicious, policy violating, or business disruption patterns.

Traffic refers to electronic communication transmitted into, out of, and/or within the network 106. A traffic rate may be calculated for a device by dividing the amount of traffic handled by the device over a given period of time. The network 106 is preferably configured so that all traffic incoming, outgoing and within the network 106 must pass through the one or more security devices. This allows the maximum amount of traffic to be monitored with the fewest number of security device(s). While not all traffic in the network 106 has to pass through the one or more security devices, the present invention only detects and mitigates threats from traffic that does pass through the one or more security devices. Thus, to maximize the effectiveness of the present invention, as much of the network 106 traffic as possible, and preferably all of the network traffic, passes through the one or more security devices.

It is becoming increasingly common for networks, typically of corporations or governments, to be attacked. One method of attacking a network 106 is through the use of a Distributed Denial-of-Service (DDoS) attack. A DDoS attack typically floods the targeted network 106 with communication requests which prevent or slows the network 106 in responding to legitimate network 106 traffic. A DDoS attack is an attempt to make a network 106 (or resources that comprise the network 106) unavailable for its intended users. A DDoS attack tries to overload a network 106 and its resources and render the network 106 unusable.

Methods of creating a DDoS attack are, unfortunately, well known and easily discovered on the Internet. The perpetrator of a DDoS attack must first gain control over a number of compromised computers. Typically, the larger the number of compromised computers, the larger and more damaging the DDoS attack. The DDoS attack is initiated by the perpetrator ordering the compromised computers under the perpetrator's control to request services or otherwise engage the network 106 over a period of time. The service requests are typically those that place a substantial burden on the resources of the network 106. The combined traffic generated by the compromised computers aimed at the network 106 is referred to as the DDoS traffic. DDoS traffic may be expressed in terms of the total amount of data received or, preferably, the amount of data received over a period of time.

Figure 2:
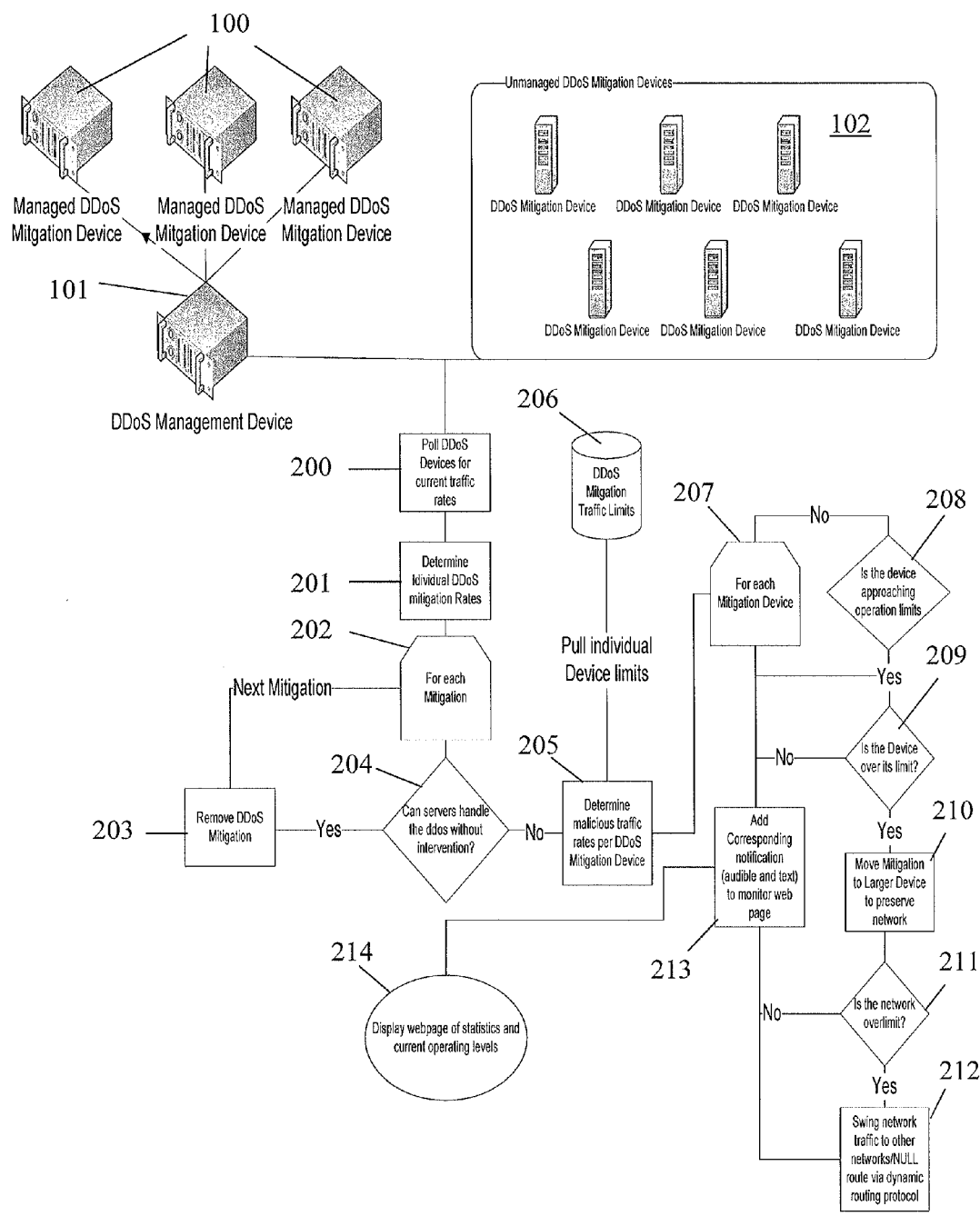
FIG. 2 is a flow diagram illustrating a possible embodiment of a method for rapid detection and mitigation of threats to a network.

FIG. 2 illustrates one embodiment of the present invention for mitigating a DDoS attack. In this embodiment, a first plurality of DDoS Devices 100, 101, 102 may receive network traffic for a network 106. Preferably, all network traffic enters the network 106 through the first plurality of DDoS Devices 100, 101, 102 and/or IDS 104. A traffic rate may be periodically polled for each of the DDoS Devices 100, 101, 102 and IDS 104 by one or more Rsyslog server(s) 103. (Step 200)

A throughput capability, or DDoS mitigation rate, for each of the DDoS Devices may also be determined. (Step 201) The throughput capability or DDoS mitigation rate is a rate in pps (packets per second) and/or bps (bits per second) that malicious traffic is dropped or disrupted. The throughput capability or DDoS mitigation rate may be found from the specification created by the manufacturer for each DDoS Device or from empirical testing.

The polled traffic rate may be compared with the throughput capability for each DDoS Device to determine if each DDoS Device can handle its polled traffic rate without intervention. (Steps 202, 204) Intervention may include the act of manually modifying settings on DDoS Devices and/or distribution of DDoS attacks to DDoS mitigation devices to improve performance. Past DDoS mitigations may be removed from each DDoS Device that has a greater throughput capability than its current polled traffic rate. (Step 203) Specifically, a mitigation from a DDoS mitigation device may be removed that is no longer required to stop the DDoS attack from disrupting service to the network 106.

A malicious traffic rate, or the rate at which traffic is being identified as unwanted and subsequently dropped from the transmission path, may be determined for each of the DDoS Devices by polling each device. (Step 205)

An operational limit capability for each DDoS Devices may be determined, for example, by pulling individual device limits from a DDoS Mitigation Traffic Limits database. (Step 206) An operational limit capability is the maximum rate in pps (packets per second) and/or bps (bits per second) that a device can process without dropping packets.

A notification may be sent to a monitor web page for each DDoS Device in the first plurality of DDoS Devices that has its malicious traffic rate approach its operational limit capability within a predetermined amount. (Steps 207, 208, 213)

A notification to a monitor web page may be an audible or visual alert communicated to a web page which will display and/or play the alert.

For each DDoS Device in the first plurality of DDoS Devices that has its malicious traffic rate greater than its operational limit capability, a notification may be sent to the monitor web page and traffic from the DDoS Device may be routed to a second DDoS Device that has an operational limit capability greater than the malicious traffic rate. (Steps 209, 210, 213) This process may include moving traffic from a DDoS Device which cannot handle inspecting the amount of traffic (measured in pps/bps), to a higher performing device that can handle network traffic.

As an enhancement, a malicious traffic rate and an operational limit capability may be determined for the first plurality of DDoS Devices. If the malicious traffic rate for the first plurality of DDoS Devices approaches the operational limit capability for the first plurality of DDoS Devices within a predetermined amount, a notification may be sent to the monitor web page. (Step 213) If the malicious traffic rate for the first plurality of DDoS Devices is greater than the operational limit capability for the first plurality of DDoS Devices, a notification may be sent to the monitor web page and the network traffic may be swung from the first plurality of DDoS Devices to a second plurality of DDoS Devices. (Steps 211, 212, 2013) This process may include shifting the network traffic's path so that it flows to a different location (and a different plurality of DDoS Devices) that may or may not be geographically different.

Figure 3:
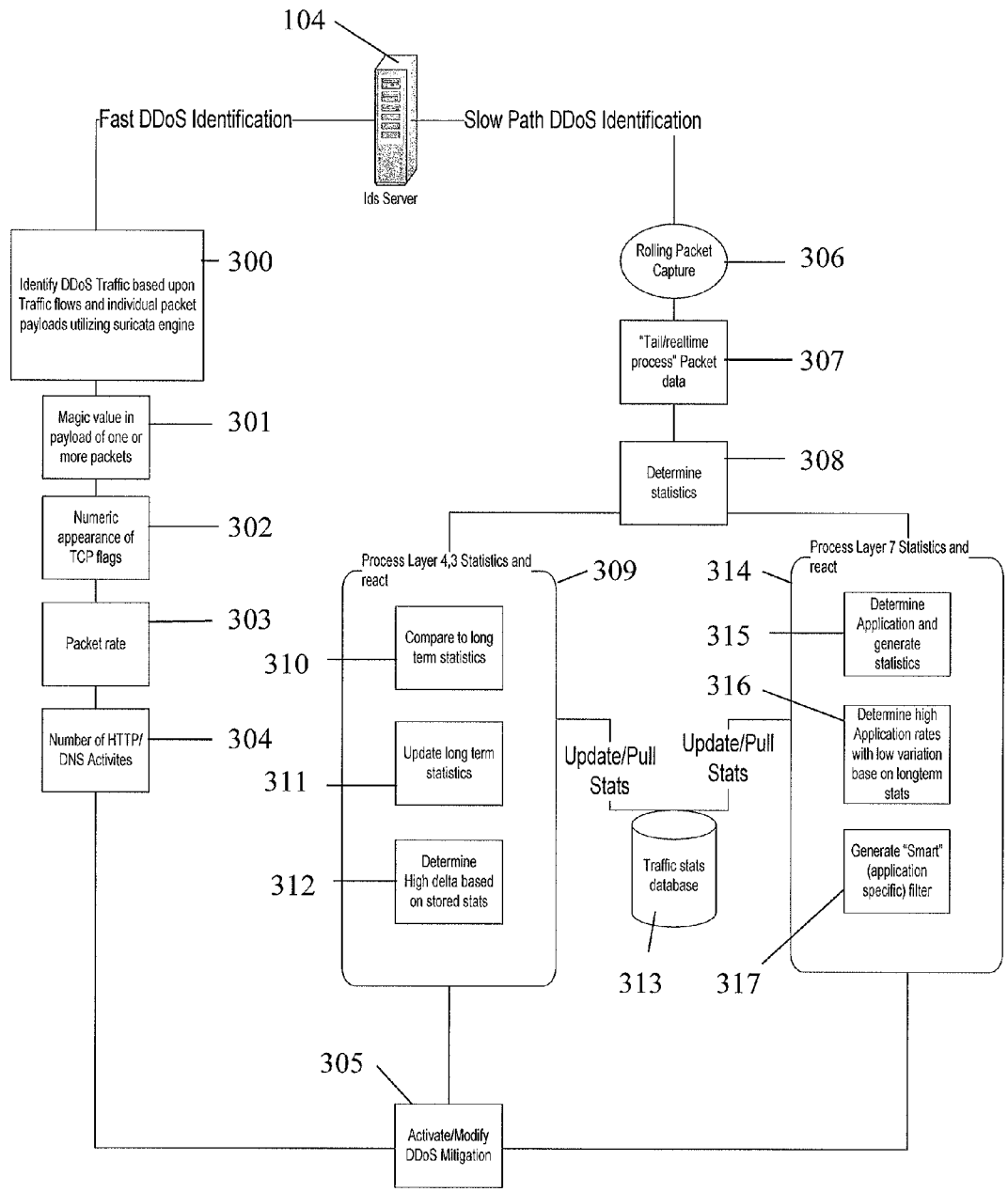
FIG. 3 is a flow diagram illustrating a possible embodiment of a method for rapid detection and mitigation of threats to a network.

FIG. 3 illustrates another embodiment of the present invention. Network traffic (including DDoS traffic) is initially routed through one or more security device (IDS Server 104 is shown in FIG. 3 as a non-limiting example) and may be identified based upon traffic flow (as examples, repetitive requests either from or to the same IP address) and/or individual packet payloads utilizing an intrusion detection and prevention engine. (Steps 300, 301) An intrusion detection and prevention engine may include analytical software utilized to inspect for known patterns. A validity of a combination of flag values in a Transmission Control Protocol (TCP) header may be determined by an intrusion detection and prevention engine. If the combination of flag values in the TCP header are not valid, a first DDoS mitigation may be activated. (Steps 302, 305)

A number of TCP flags received over a first period of time may be determined. If the number of TCP flags received over the first period of time exceeds a first predetermined threshold, a second DDoS mitigation may be activated. A number of packets received over a second period of time may be determined. If the number of packets received over the second period of time exceeds a second predetermined threshold, a third DDoS mitigation may be activated. (Steps 303, 305) This data may be pulled from the Open Systems Interconnection (OSI) Model layer 3 and/or OSI Model layer 4 of the network traffic. A number of HTTP or DNS activities over a third period of time may be determined. This data may be pulled from the OSI Model layer 7 of the network traffic. If the number of HTTP or DNS activities over the third period of time exceeds a third predetermined threshold, a fourth DDoS mitigation may be activated. (Steps 304, 305)

In another embodiment illustrated in FIG. 3, a plurality of IDS may be used to capture a plurality of packet data from network traffic into a network 106. (Step 306) The plurality of IDS, or other suitable automated means, may process the plurality of packet data. (Step 307) A first one or more statistics may be calculated from the plurality of packet data.

(Step 308) The statistics may vary per applications, but could be, as non-limiting examples, TCP header information such as which source/destination IP from/to with which TCP flags and which source and destination port over time, HTTP verbs over time and/or gets or queries for websites/domains over time.

A second one or more statistics may be read from a traffic stats database 313. The first one or more statistics may be stored in the traffic stats database 313. (Step 311) A change in the network traffic may be determined by comparing the first one or more statistics with the second one or more statistics. DDoS mitigation may be activated or modified based on changes in the network traffic. (Step 305)

Further, a high delta based on the first one or more statistics and the second one or more statistics may be determined. (Step 312) Processing the plurality of packet data is preferably done in real time. The first one or more statistics may be calculated by one or more of the IDS, by a server or by a combination of IDS and servers. The change in traffic may be determined using statistics gathered over a given period of time. Calculating the first one or more statistics from the plurality of packet data may use OSI Model layer 3, OSI Model layer 4, and/or OSI Model layer 7.

In a preferred embodiment of calculating one or more statistics, a mean (z) for a running number of x minute samples (x is preferably between 1 and 5) may be calculated. If the standard deviation of a new sample is above y (a set deviation derived from all previous samples) and the sample is higher than the average, a mitigation on the end point may be started. If the standard deviation is lower than y, the new sample may be added to the running number of x minute samples to produce a new mean (z) and y may be adjusted accordingly.

In another embodiment illustrated in FIG. 3, a plurality of IDS may be used to capture, process, and calculate statistics from data in network traffic entering a network 106. (Steps 306, 307, 308) An application and an application rate corresponding to the data may be determined. (Step 315) A first one or more statistics may be calculated from the data. A second one or more statistics may be read from a traffic stats database 313. The traffic stats database 313 may be stored on a hard disk drive or other data storage device so that statistics may be used to discover trends in traffic. The first one or more statistics may be stored in the traffic stats database 313 for later use. In preferred embodiments, a plurality of long term statistics may be calculated using at least the second one or more statistics and a plurality of high application rates with low variation based on the plurality of long term statistics may be determined. (Step 316) The data from the network traffic is preferably taken from an Open Systems Interconnection (OSI) Model layer 3, OSI Model layer 4, and/or OSI Model layer 7. A filter may be generated that is specific to the application. (Step 317) A DDoS mitigation may then be activated or modified using the generated filter. (Step 306)

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A system comprising:
    a security device comprising a router, a switch, a firewall or a load balancer executing instructions to receive a network traffic as a plurality of packets;
    an intrusion detection system server executing instructions to capture and monitor a traffic flow through the security device;
    a server computer executing instructions to:
        identify, in real time within the plurality of packets, a plurality of statistics based on a traffic flow rate or a pattern data;
        execute a database query to select a threshold from the database, the threshold being calculated from a mean and a standard deviation of a plurality of historical statistics for a plurality of historical traffic flow rates or a plurality of historical pattern data;
        responsive to a determination that the plurality of statistics are beyond the threshold, activate or modify a mitigation settings script using a dynamic routing protocol to route the network traffic to at least one additional security device; and
        responsive to a determination that the plurality of statistics are within the threshold:
            execute a database query to insert the plurality of statistics into the database;
            calculate an updated mean and standard deviation including the plurality of statistics; and
            disable or modify the mitigation settings script to return the traffic flow to an original transmission route.

2. The system of claim 1, wherein the server computer executes instructions to generate a web page comprising statistics and current operating levels, wherein, responsive to the determination that the plurality of statistics are beyond the threshold, the web page comprises a notification that the plurality of statistics are beyond the threshold.

3. The system of claim 1, wherein:
    the pattern data comprises a transmission control protocol (TCP) flag value within a control or meta data in a header of a packet payload controlling a data section within a TCP packet in the traffic flow; and
    responsive to the pattern data matching a malicious, invalid, or illegitimate pattern, the server computer executes instructions to route the network traffic to the at least one additional security device.

4. The system of claim 1, wherein the server computer executes instructions to:
    execute a database query selecting an operational limit capacity for the security device, defining the capacity for maximum rate of packets per second or bits per second before dropping packets, from a mitigation traffic limits database; and
    calculate the threshold according to the operational limit capacity.

5. The system of claim 1, wherein the plurality of statistics comprise an amount of:
    at least one TCP flag value within a control or meta data in a header of a packet payload controlling a data section within a TCP packet in the traffic flow; or
    at least one packet in the traffic flow.

6. The system of claim 1, wherein the plurality of statistics comprise an amount of:

at least one hypertext transfer protocol (HTTP) activity comprising at least one HTTP verb; or at least one domain name system (DNS) activity comprising at least one DNS query.

7. The system of claim 1, wherein the server computer executes instructions to:

identify, within at least one TCP packet within the network traffic, a software application, an IP address, or a user that transmitted the at least one TCP packet; and generate, from a statistics data stored from the software application, a software application filter defining a packet threshold specific to the software application, the IP address, or the user.

8. The system of claim 1, wherein the threshold comprises a delta defining the difference between the mean and the standard deviation and a difference between the mean and the plurality of statistics.

9. A method comprising:

executing, by a security device coupled to a network and comprising a router, a switch, a firewall or a load balancer, instructions to receive a network traffic as a plurality of packets;

executing, by an intrusion detection system server coupled to the network, instructions to capture and monitor a traffic flow through the security device;

identifying, by a server computer coupled to the network comprising at least one processor executing instructions within a memory, in real time within the plurality of packets, a plurality of statistics based on a traffic flow rate or a pattern data;

executing, by the server computer, a database query to select a threshold from the database, the threshold being calculated from a mean and a standard deviation of a plurality of historical statistics for a plurality of historical traffic flow rates or a plurality of historical pattern data;

responsive to a determination that the plurality of statistics are beyond the threshold, activating or modifying, by the server computer, a mitigation settings script using a dynamic routing protocol to route the network traffic to at least one additional security device; and responsive to a determination that the plurality of statistics are within the threshold:

executing, by the server computer, a database query to insert the plurality of statistics into the database;

calculating, by the server computer, an updated mean and standard deviation including the plurality of statistics; and disabling or modifying, by the server computer, the mitigation settings script to return the traffic flow to an original transmission route.

10. The method of claim 9, further comprising the step of executing, by the server computer, instructions to generate a web page comprising statistics and current operating levels, wherein, responsive to the determination that the plurality of statistics are beyond the threshold, the web page comprises a notification that the plurality of statistics are beyond the threshold.

11. The method of claim 9, wherein:

the pattern data comprises a transmission control protocol (TCP) flag value within a control or meta data in a header of a packet payload controlling a data section within a TCP packet in the traffic flow; and further comprising the step of, responsive to the pattern data matching a malicious, invalid, or illegitimate pattern, routing, by the server computer, the network traffic to the at least one additional security device.

12. The method of claim 9, further comprising the steps of:

executing, by the server computer, from a mitigation traffic limits database, a database query selecting an operational limit capacity for the security device, defining the capacity for maximum rate of packets per second or bits per second before dropping packets; and calculating, by the server computer, the threshold according to the operational limit capacity.

13. The method of claim 9, wherein the plurality of statistics comprise an amount of:

at least one TCP flag value within a control or meta data in a header of a packet payload controlling a data section within a TCP packet in the traffic flow; or at least one packet in the traffic flow.

14. The method of claim 9, wherein the plurality of statistics comprise an amount of:

at least one hypertext transfer protocol (HTTP) activity comprising at least one HTTP verb; or at least one domain name system (DNS) activity comprising at least one DNS query.

15. The method of claim 9, further comprising the steps of:

identifying, by the server computer, within at least one TCP packet within the network traffic, a software application, an IP address, or a user that transmitted the at least one TCP packet; and generating, by the server computer, from a statistics data stored from the software application, a software application filter defining a packet threshold specific to the software application, the IP address, or the user.

16. The method of claim 9, wherein the threshold comprises a delta defining the difference between the mean and the standard deviation and a difference between the mean and the plurality of statistics.

* * * * *